United States Patent
Östrup et al.

(10) Patent No.: US 9,179,348 B2
(45) Date of Patent: Nov. 3, 2015

(54) METHODS AND RADIO BASE STATIONS FOR DETERMINING PERFORMANCE STATE OF A CELL

(75) Inventors: Peter Östrup, Linköping (SE); Diana Andrei, Linköping (SE); Pontus Sandberg, Linköping (SE); Peter Werner, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 88 days.

(21) Appl. No.: 13/701,556

(22) PCT Filed: Jul. 5, 2010

(86) PCT No.: PCT/SE2010/050773
§ 371 (c)(1),
(2), (4) Date: Dec. 3, 2012

(87) PCT Pub. No.: WO2012/005633
PCT Pub. Date: Jan. 12, 2012

(65) Prior Publication Data
US 2013/0143550 A1    Jun. 6, 2013

(51) Int. Cl.
*H04W 24/08*     (2009.01)
*H04W 24/10*     (2009.01)

(52) U.S. Cl.
CPC ............. *H04W 24/10* (2013.01); *H04W 24/08* (2013.01)

(58) Field of Classification Search
CPC ...... H04W 24/00; H04W 24/10; H04W 24/08
USPC ............... 455/453, 423, 452.1, 424; 370/242, 370/252; 379/32.01
See application file for complete search history.

(56) References Cited

U.S. PATENT DOCUMENTS

| | | | |
|---|---|---|---|
| 2003/0060192 A1* | 3/2003 | Oestreich | 455/423 |
| 2005/0130645 A1* | 6/2005 | Albert Dobson et al. | H04L 41/00 455/423 |

(Continued)

FOREIGN PATENT DOCUMENTS

| | | | | |
|---|---|---|---|---|
| WO | WO 2009/031959 A1 | | 3/2009 | |
| WO | WO 2009031959 A1 * | | 3/2009 | 370/242 |
| WO | WO 2009099224 A1 * | | 8/2009 | 455/453 |

OTHER PUBLICATIONS

International Search Report, PCT Application No. PCT/JP2010/060252, Sep. 14, 2010.

(Continued)

*Primary Examiner* — Farideh Madani
(74) *Attorney, Agent, or Firm* — Myers Bigel Sibley & Sajovec, P.A.

(57) ABSTRACT

The invention relates to a method in a first radio base station for determining a performance state of a first cell served by the first radio base station, which first radio base station is comprised in a radio communications network. The method comprises determining traffic statistics of the first cell, comparing the traffic statistics with a threshold value, when the determined traffic statistics goes beyond the threshold value, transmitting a data request to a second radio base station requesting data retrieved in or associated with a second cell to be used to determine performance state of the first cell, receiving a data response indicating the requested data from the second radio base station, and determining the performance state of the first cell based on the data response.

17 Claims, 7 Drawing Sheets

(56) References Cited

U.S. PATENT DOCUMENTS

| | | | | |
|---|---|---|---|---|
| 2007/0243874 A1* | 10/2007 | Park | ............... | H04W 72/082 |
| | | | | 455/442 |
| 2009/0137251 A1* | 5/2009 | Ji | ............... | H04W 36/22 |
| | | | | 455/437 |
| 2012/0282930 A1* | 11/2012 | Ahluwalia | ............... | 455/436 |

OTHER PUBLICATIONS

C. Mueller et al.: "A Cell Outage Detection Algorithm Using Neighbor Cell List Reports", Dec. 10, 2008, Self-Organizing Systems, Springer Berlin Heidelberg, Berlin, Heidelberg, pp. 218-229, XP019113414, ISBN: 978-3-540-92156-1.

* cited by examiner

METHODS AND RADIO BASE STATIONS FOR DETERMINING PERFORMANCE STATE OF A CELL

CROSS-REFERENCE TO RELATED APPLICATION

This application is a 35 U.S.C. §371 national stage application of PCT International Application No. PCT/SE2010/050773, filed on 5 Jul. 2010. The above-referenced PCT International Application was published in the English language as International Publication No. WO 2012/005633 A1 on 12 Jan. 2012. The disclosure of the above-referenced application is hereby incorporated herein in its entirety by reference.

TECHNICAL FIELD

The invention relates to radio base stations and methods therein in a radio communications network, in particular, for determining a performance state of a cell in the radio communications network.

BACKGROUND

In radio communications networks of today the number of radio base stations is increasing as well as the number of cells. It is important to detect a malfunction in a cell of the radio base station in order to provide a reliable radio communications network with available communications possibilities. There exist a number of different fault detection systems in radio base stations of today. Such fault detection systems comprise sensors, software triggered observability functions and similar devices that generate an alarm when malfunction is detected and an operator or similar is informed about the alarm. Thus, the operator is made aware of the malfunction.

However, the radio base stations of today comprise a numerous of components and software in which malfunctions might not be detected by installed monitoring equipment and thus some malfunctions may not be detected. For example, when cells no longer carries any traffic, when no incoming handovers are detected or when no new attached user equipments are allowed are examples that may occur when there are no active user equipments in the cell or when a faulty state of the cell. A faulty state means that the cell suffers from an abnormal state or condition and is often referred to as a Sleeping Cell.

A number of solutions have been discussed whereby a sleeping cell may be efficiently detected.

In one proposed solution, a traffic history of traffic statistics in the cell is kept in each radio base station of the network e.g. for one week. When current traffic statistics shows a low activity in the cell, a comparison is made against the traffic history to see if the low activity is "normal" or not. The problem with such a solution is that it is very hard to implement an algorithm that can learn at the same time as it can detect faulty situations.

In another proposed solution, a number of "self-tests" are performed, i.e. when the traffic statistics show low activity in the cell, a number of tests are performed. One test would be to awake user equipments in Idle Mode and ask the user equipments to contact the network, i.e. the radio base station, via a random access channel. A problem with the self-test solution is that the test procedures that have been proposed so far have been questioned from a number of angles, e.g. interoperability with user equipments, robustness, accessibility downgrading etc.

SUMMARY

An object of embodiments herein is to provide a mechanism that enables detection of degraded performance state of a cell in a radio communications network in a reliable manner.

According to a first aspect of embodiments herein the object is achieved by providing a method in a first radio base station for determining a performance state of a first cell served by the first radio base station. The first radio base station is comprised in a radio communications network.

The first radio base station determines traffic statistics, for example, number of access attempts, handover requests sent and/or received, amount of uplink and/or downlink traffic, of the first cell. The first radio base station compares the traffic statistics with a threshold value. When the determined traffic statistics goes beyond the threshold value, the first radio base station transmits a data request to a second radio base station requesting data retrieved in or associated with a second cell to be used to determine the performance state of the first cell. For example, the first radio base station may request measurement data of the first cell obtained in the second cell or traffic statistics of the second cell.

The first radio base station receives a data response indicating the requested data from the second radio base station. The first radio base station then determines the performance state of the first cell based on the data response.

In order to perform the method a first radio base station is provided. The first radio base station is provided for determining a performance state of a first cell served by the first radio base station. The first radio base station is arranged to be comprised in a radio communications network. The first radio base station comprises a determining circuit configured to determine traffic statistics of the first cell. In addition, the first radio base station comprises a comparing circuit configured to compare the traffic statistics with a threshold value. The first radio base station comprises a transmitting circuit configured to transmit, when the determined traffic statistics goes beyond the threshold value, a data request to a second radio base station requesting data retrieved in or associated with a second cell to be used to determine the performance state of the first cell. The first radio base station further comprises a receiving circuit configured to receive a data response indicating the requested data from the second radio base station. The first radio base station also comprises an additional determining circuit configured to determine the performance state of the first cell based on the data response.

According to a second aspect of embodiments herein a method in a second radio base station for enabling a first radio base station to determine a performance state of a first cell served by the first radio base station is provided. The first and second radio base stations are comprised in a radio communications network and the second radio base station serves a second cell of the radio communications network.

The second radio base station receives a data request from the first radio base station requesting data retrieved in or associated with the second cell to be used to determine the performance state of the first cell. The second cell determines the requested data and transmits a data response to the first radio base station indicating the determined requested data.

In order to perform the method a second radio base station is provided. The second radio base station is arranged to enable the first radio base station to determine the performance state of the first cell served by the first radio base station. The first and second radio base stations are arranged to be comprised in a radio communications network. The second radio base station is configured to serve a second cell of the radio communications network.

The second radio base station 14 comprises a receiving circuit configured to receive a data request from the first radio base station. The data request is requesting data retrieved in or associated with the second cell to be used to determine the performance state of the first cell to be used to determine the performance state of the first cell. Furthermore, the second radio base station comprises a determining circuit configured to determine the requested data, and a transmitting circuit. The transmitting circuit is configured to transmit a data response to the first radio base station indicating the determined requested data.

Embodiments herein provide a fault detection method that is based on internal cell supervision as well as external, i.e. from the second cell, cell supervision thereby providing a more reliable manner to detect malfunctions that is also attractive to the operators. The present solution provides a possibility to determine the performance state of the first cell with the assistance of the second radio base station by analyzing data retrieved in or associated with the second cell of the second radio base station.

Some first embodiments provide the possibility to test suspected cells with the use of connected user equipments in a neighboring cell or cells. An example of a solution is to test whether connected user equipments in the second cell are able to measure CGI/PCI of the first cell through its broadcast channel. Based on these test measurements, reported back to the first radio base station, the first radio base station determines the performance state of the first cell in a reliable manner.

Some second embodiments provide a solution to interrogate cells in the surrounding geographical area about their traffic statistics or traffic situation when detecting low traffic activity in the own cell. That is, the exemplified solution assumes that a lowered traffic activity occurs on a larger geographical area than on a cell level.

For example, when there is higher traffic activity in a portion of adjacent cells, located on other hardware than the first cell, than in the own first cell, the first cell is considered to be in a degraded performance state and an alarm is issued. Consequently, when the traffic activity in a portion of the adjacent cells is as low as in the first cell, the first cell is considered to be functional.

BRIEF DESCRIPTION OF THE DRAWINGS

Embodiments will now be described in more detail in relation to the enclosed drawings, in which.

DETAILED DESCRIPTION

Figure 1:
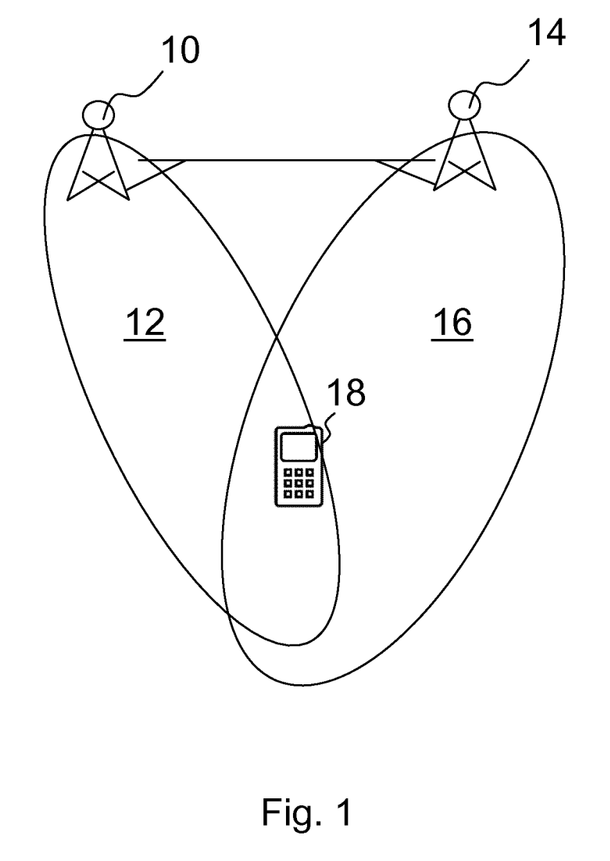
FIG. 1 is a schematic overview depicting a radio communications network.

FIG. 1 shows a schematic overview of a radio communications network, such as e.g. the Long Term Evolution (LTE), LTE-Advance (Adv), 3rd Generation Partnership Project (3GPP) Wideband Code Division Multiple Access (WCDMA) system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few arbitrary possible options. The radio communications network comprises a first radio base station (RBS) 10 serving a first cell 12 and a second radio base station 14 serving a second cell 16. In the second cell 16 a user equipment 18 is connected to the second radio base station 14. The purpose of the illustration in FIG. 1 is to provide a general overview of the present methods and the functionalities involved. The first radio base station 10, also known as the source radio base station 10, is connected to the second radio base station 14, also known as the target radio base station 14, over an inter radio access network interface, such as an X2 interface or the like.

A radio base station, such as the first and the second radio base stations 10,14, may be referred to as e.g. a NodeB, an evolved Node B (eNB, or eNode B), a base transceiver station, Access Point Base Station, base station router, or any other network unit capable to communicate with a user equipment within respective cell 12,16, depending e.g. of the radio access technology and terminology used. In the rest of the description, the term "radio base station" will be used in order to facilitate the comprehension of the present methods and devices.

The user equipment 18 may be represented by e.g. a wireless communication terminal, a mobile cellular phone, a Personal Digital Assistant (PDA), a wireless platform, a laptop, a computer or any other kind of device capable to communicate wirelessly with a radio base station.

Herein it is provided a method to determine performance state of the first cell 12 in a reliable and operator friendly manner. The first radio base station 10 detects an indication that the performance of the first cell 12 may be degraded. For example, the first radio base station 10 monitors the traffic statistics of or within the first cell 12 over a time interval or period. When the traffic statistics falls below a threshold value the first radio base station 10 determines that the first cell 12 may be of degraded performance. Thus, the first radio base station 10 monitors traffic statistics, such as number of access attempts, handover requests sent and/or received, amount of uplink (UL) and/or downlink (DL) traffic, or other transmission activity, within the first cell 12 over the time interval. The monitored traffic statistics is then compared to the threshold value. This threshold value may indicate traffic statistics e.g. set during configuration, set manually, and/or based on historical monitored traffic statistics collected over a similar time interval changing dynamically. Examples of such threshold values may be a value indicating number of failed handover requests transmitted or number of random access requests over a random access channel (RACH) or similar.

If the monitored traffic statistics goes beyond the threshold value, for example, exceeds a top limit value or goes below a minimum limit value, the first radio base station 10 determines that there may be a degradation of the performance of the first cell 12.

When the first radio base station 10 determines that the first cell 12 may be in a degraded performance state, also referred to as a sleeping cell, the first radio base station 10, according to the present solution, sends a data request to the second radio base station 14. The data request is requesting data from the second cell 16, which data is to be used to determine the performance state of the first cell 12.

The requested data may be data retrieved in the second cell indicating a result of a test measurement performed by the user equipment 18 connected to the second cell 16, see FIG. 2 below, or be associated with the second cell 16 indicating traffic statistics of the second cell 16, see FIG. 3. Thus, the data is retrieved in the second cell 16 or associated with the second cell 16. These different examples are explained in more detail below.

Finally, the first radio base station 10 receives a data response from the second radio base station 14, which data response is used by the first radio base station 10 to determine the performance state of the first cell 12.

For example, when received traffic statistics indicate higher traffic activity in the second cell 16 than in the first cell 12, the first cell 12 is considered to be of degraded state and an alarm may be issued to an operator or similar. Before the alarm is raised a number of other tests on different channels may be performed to ensure the determined performance state. When there is as low traffic activity in the second cell 16 as in the first cell 12, the first cell 12 is considered to be functional.

In the example of initiating the test measurement, the first cell 12 may be considered to be functional when the test measurement is reported as successful from the second radio base station 14. The first cell 12 may be considered as cell of degraded state when receiving a report of a failed test measurement.

Thus, embodiments herein provide a mechanism which will increase network operability due to the possibility to detect suspicious degraded cells. Also, a request message is herein provided which will increase network operability due to the possibility to detect suspicious sleeping cells.

In the illustrated example the second cell 16 is neighbouring the first cell 12. However, it should be noted that the second cell 16 does not have to be a neighbouring cell to the first cell 12 when comparing traffic statistics of the different cells. It may be enough that the second radio base station 14 serves a neighbouring cell which may be a cell different than the second cell 16.

Figure 2:
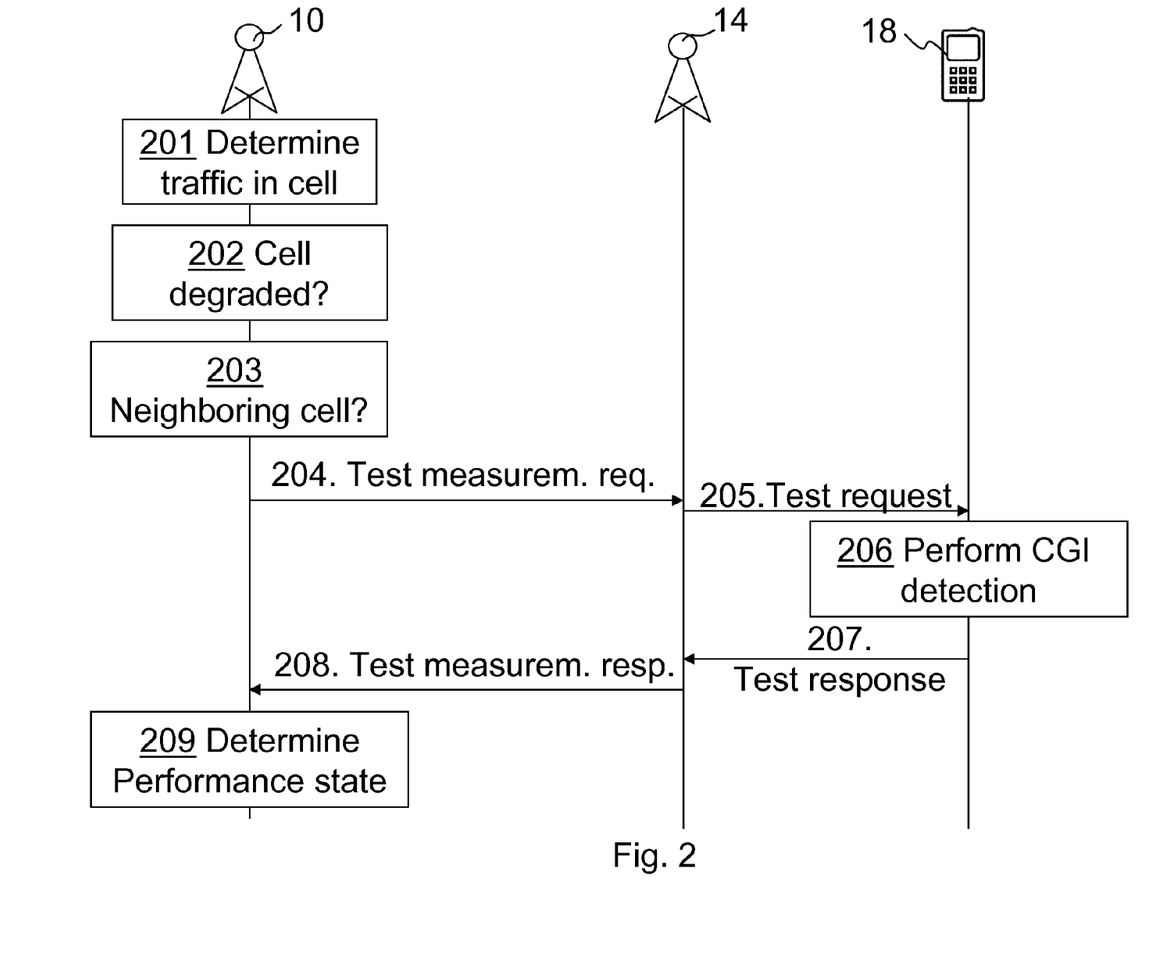
FIG. 2 is a combined method and signalling scheme in a radio communications network illustrating embodiments of the solution defined herein.

FIG. 2 is a schematic overview of a combined method and signalling scheme of some first embodiments according the present solution. FIG. 2 illustrates the example mentioned above wherein the first radio base station 10 determines the performance state of an internal cell, the first cell 12, based on a test measurement of the user equipment 18 in an external cell, the second cell 16, of the second radio base station 14.

Step 201. The first radio base station 10 determines traffic statistics within the first cell 12 of the first radio base station 10 over a time interval. This may be performed in that the first radio base station 10 determines traffic statistics such as random access requests, number of handover requests or the like, over the time interval using internal counters arranged in the first radio base station 10.

Step 202. The first radio base station 10 then determines that the first cell 12 may be a degraded cell, that is, a cell of degraded performance. This may be performed by comparing the traffic statistics with a preset, preconfigured or continuously updated threshold value. When the determined traffic statistics goes beyond the threshold value, e.g. below a minimum threshold value or above a maximum threshold value, it is determined that the first cell 12 may be in a degraded state. When the determined traffic statistics goes beyond the threshold value the network may suffer from degraded cell performance, for example, a cell of a faulty state or abnormal state called a Sleeping Cell.

Thus, the present solution illustrated in FIG. 2 initiates a test procedure performed by user equipments, such as the user equipment 18, in cells neighboring the suspected sleeping cell, in this case, the first cell 12.

Step 203. This is an optional step wherein the first radio base station 10 uses stored data indicating Automatic Neighboring Relations (ANR) cells to determine which second radio base station 14 to transmit the test measurement request to. Thus, embodiments herein may use ANR to collect information from neighboring cells in for example the LTE Radio Access Network (RAN). These ANRs are built by using cell identities such as Physical Cell Identity (PCI) and Cell Global Identity (CGI) detected during handover procedure or similar. The determination and selection of the second radio base stations may also be performed in a different manner, for example, from a stored list or similar.

An existing Neighbor cell Relation (NR) from a first cell to a second cell means that the first radio base station 10 controlling the first cell 12 knows the Enhanced CGI/CGI and PCI of the second cell 16. The first radio base station 10 has an entry in a Neighbor cell Relation table (NRT) for the first cell 12 identifying the second cell 16. That is, the second cell 16 is defined in the NRT as a neighbouring cell to the first cell 12.

Step 204. The first radio base station 10 then transmits a data request in the form of a test measurement request to the second radio base station 14 serving a second cell 16 neighbouring the first cell 12. The test measurement request comprises an indication that one or more user equipment in the second cell 16 is ordered to perform a performance test measurement of the first cell 12. The test measurement request may further comprise cell identities, such as first CGI and PCI and second cell identity and other data.

Thus, if it is determined that the first cell may be in a degraded performance state, the first radio base station 10 may utilize a number of user equipments in connected mode, such as Radio Resource Control Connected mode in LTE, to the second cell 16 to test the cell performance of the first cell 12.

In some embodiments, the test measurement request may, for example, be an X2-AP message which is sent to the second radio base station 14. The X2 AP message may be referred to as a measureCGIRequest comprising first PCI, first CGI, second Cell Id, Number of user equipments In Measurement, and Time to Live value. Upon receiving this X2-AP message, the second radio base station 14 initiates a test measurements process based on the parameter Number of user equipments in measurement. Selected user equipments in the second cell 16, of a number corresponding to the indicated number of user equipments in the measureCGIRequest, initiate CGI measurements on first radio base station cell, the first cell 12, using the Physical Cell Identity (PCI) of the first cell 12. Number of user equipment participating in the measurement may be defined in the measureCGIRequest or alternatively be predefined in the receiving second radio base station 14. Similarly, the Time to live parameter may be defined in the measureCGIRequest or defined in the receiving second radio base station 14.

Step 205. The second radio base station 14 then forwards, or compiles a new measurement request and sends the measurement request, referred to as a test request, to a number of connected user equipments. In the illustrated example, the test request is sent to the user equipment 18 served by the second radio base station 14. The test request indicates that the user equipment 18 shall perform a performance test measurement. The second radio base station 14 may comprise an algorithm defining that a preset percentage of connected users should be ordered to perform the test measurement.

Step 206. The user equipment 18 receives the test request and after reception of the test request the user equipment 18 performs the performance test measurement. Such a performance test measurement may be to identify or detect Cell Global Identity (CGI)/Physical Cell Identities (PCI) on a broadcast channel in the radio communications network. Thus, the user equipment 18 thereby listens to PCIs broadcasted on the broadcast channel in the second cell 16 and reports back detected PCIs to the second radio base station 14. If a PCI matches a PCI in the test measurement request, that is, the second PCI sent from the first cell 12, the second radio base station 14 orders the user equipment to retrieve CGI of the first cell 12.

The user equipment 18 then retrieves the CGI in the system information broadcasted on the broadcast channel corresponding to the PCI.

Step 207. The user equipment 18 may report the retrieved CGI back to the second radio base station 14. This report may be transmitted as a test response to the test request. Thus, the user equipment 18 applies the system information acquisition procedure to acquire system information that is broadcasted by the first radio base station 10. This is, for example, done by user equipment in Radio Resource Control (RRC)_IDLE mode and in RRC_CONNECTED mode.

Step 208. If the reported CGI in the test response matches the CGI indicated in the received test measurement request the second radio base station 14 reports in a test measurement response that the test was successfully performed back to the first radio base station 10 as a data response. However, if the reported CGI does not match or no test response is received within a preset time to live time the second radio base station reports in the test measurement response that the test failed back to the first radio base station 10. Also, the test measurement may merely be active during the time specified in attribute Time To Live in the data request. If the user equipment 18 does not answer until this time to live expires, the test measurement response back to first radio base station 10 comprises a test failed response attribute.

In the example of the measureCGIRequest message, this message may then be answered with a measureCGIResponse (Result) message. The measureCGIResponse(Result) message is sent back to the first radio base station 10 with the result of the test, which may be:
- "selection base too small"—If the selection base of user equipments in the second cell 16 is too small, compared to "number of user equipments in measurement"—attribute, the second radio base station 14 may report "selection base too small" in the test measurement response back to the first radio base station 10,
- "test failed", and
- "test succeeded".

It should here be noted that a rule to report a successful test may state that if one or more matching CGI is reported back to the second radio base station 14 the test measurement is successful.

Step 209. The first radio base station determines the performance state based on the test measurement response. The first radio base station 10 may determine that the broadcast channel of the first cell 12 to be fully functional when the test measurement is successful indicated in the test measurement response. The first cell is thus determined to be functional. Alternatively, the first radio base station 10 determines the first cell 12 as a cell in a degraded performance state when the test measurement response indicates a failed test e.g. when no user equipment connected to radio base station 14 could read PCI or CGI of the first cell 12.

Figure 3:
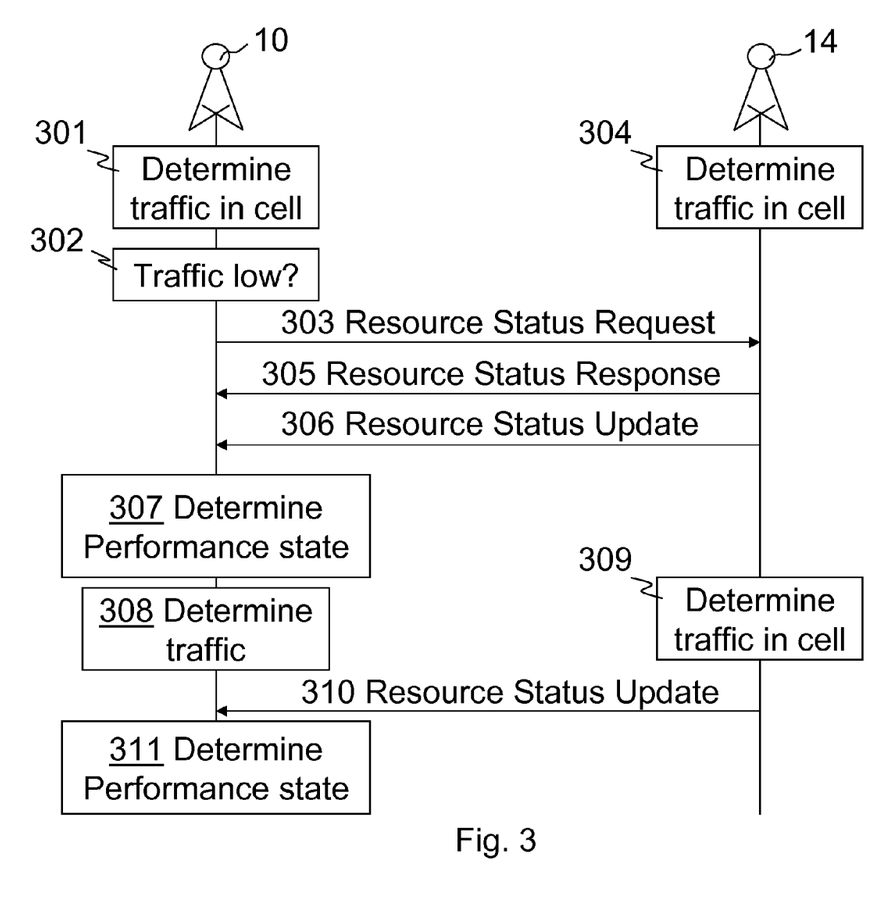
FIG. 3 is a combined method and signalling scheme in a radio communications network illustrating embodiments of the solution defined herein.

FIG. 3 is a schematic overview of some second embodiments of the present solution wherein performance state of the first cell 12 of the first radio base station 10 is based on traffic statistics of a second cell 16 of a second radio base station 14. Thus, the data request in these embodiments is represented by a traffic statistics request and the data response is represented by a traffic statistics response.

It should here be noted that the second cell 16 of embodiments herein does not have to be a neighbouring cell to the first cell 12 but merely be located within an adjacent area of the first cell 12. This may be determined to be the case if the second radio base station 14 serves at least one cell neighbouring the first cell 12. Cells neighbouring the first cell 12 may be defined in the first radio base station 10 in a Neighbour Relation Table (NRT). Thus, the second cell 16 does not have to be a neighbouring cell to the first cell 12 but the second radio base station 14 should have a relation to the first radio base station 10. That is, the second radio base station 14 has an inter radio access network interface, such as an X2 interface, established to the first radio base station 10.

Step 301. The first radio base station 10 determines traffic statistics, such as traffic activity, of the first cell 12 over, for example, a time period. Traffic statistics may comprise random access attempts on RACH, Hand Over request received or transmitted, or amount of Uplink or Downlink data. These traffic statistics may be determined by counters arranged in the first radio base station 10. This determination step may be performed with a periodicity, for example, twice an hour or the like.

Step 302. The first radio base station 10 compares the determined traffic statistics with a threshold value of traffic statistics. For example, the first radio base station 10 may determine if the traffic is low or high in the first cell 12. The threshold value may be set at the first radio base station 10 during configuration, based on historical traffic statistics collected previously or similarly.

Step 303. If the comparison in step 302 indicates that the traffic statistics is beyond the threshold value, for example, indicates a low traffic activity in the first cell 12, the first radio base station 10 may set up load measurements or merely retrieve results of load measurements in or from one or more adjacent cells. The cells are served by external radio base stations, such as the second radio base station 14. These load measurements would indicate the traffic statistics in one or more. As stated above, these external radio base stations are preferably radio base stations serving a cell neighbouring the first cell 12 such as the second cell 16 retrieved from ANR stored in the first radio base station 10.

The load measurements is set-up or requested with a traffic statistics request, such as an X2-AP message, a new message or a modified existing message. The traffic statistics request is sent from the first radio base station 10 to the second radio base station 14 to initiate or retrieve the load measurement also referred to as cell supervision measurement.

The solution may utilize the already existing X2 Resource Status Reporting procedure, as illustrated in FIG. 3, and would add information into the corresponding messages. Thus, the collecting procedure may be initiated with a Resource Status Request message sent from the first radio base station 10 to a plurality or at least one second radio base station 14. The Resource Status Request may then comprise a bit indicating that the request is for performance state detection and which traffic statistics is requested.

Step 304. The second radio base station 14 may continuously be determining traffic statistics of the load measurement reading counters or the like counting traffic statistics in the second cell 16.

However, the second radio base station 14 may alternatively upon receipt of the traffic statistics request initiate the requested corresponding traffic statistics collection referred to above as the load measurement. For example, in case the Registration Request Information Element (IE) is set to "start" in the Resource Status Request message the second radio base station resets counters and initiates a counting process. Collecting traffic statistics may be started on all cells served by the second radio base station 14 and where cell supervision is implemented.

Step 305. The second radio base station 14 may, upon reception of the traffic statistics request, optionally transmit an acknowledgement of the received traffic statistics request. In the illustrated example, the acknowledgement is in the form of a Resource Status Response. This is to inform the first radio base station 10 about successful reception and follows the Resource Status Reporting procedure.

Step 306. The second radio base station 14 then reads the determined traffic statistics from, for example, the counters or a memory with a latest determined traffic statistics. The read traffic statistics is then transmitted as the data response, such as a traffic statistics response, in the illustrated example a Resource Status Update message. The Resource Status Update message may comprise a bit indicating performance state detector. The determined traffic statistics may be traffic statistics corresponding to the traffic statistics in the first cell 12 or different traffic statistics indicating load in the second cell 16. It should here be noted that the time period of determining traffic statistics in the first cell 12 may correspond to a time period determining traffic statistics in the second cell 16.

Step 307. The first radio base station 10 receives the traffic statistics response with the traffic statistics of the second cell 16 and compares the determined traffic statistics with received corresponding traffic statistics. Based on the comparison, the performance state of the first cell 12 is determined. For example, the first cell 12 is determined to be in a degraded performance state when the compared traffic statistics differ outside a range. This range is preset or dynamically changing and is used to reduce the margin of error when determining performance state of the first cell 12. When receiving traffic statistics responses from a number of cells, the first radio base station 10 may determine performance state of the first cell 12 based on a majority of the received corresponding traffic statistics. If the majority of received traffic statistics responses indicate a similar traffic activity in the cells as the first cell 12, the first cell 12 is determined to be functional. However, if the majority of received traffic statistics responses indicate a higher traffic activity in the cells compared to the first cell 12 the first cell is determined to be in a degraded performance state.

Step 308. The first radio base station 10 may continuously monitor or determine the traffic statistics in the first cell 12 and other served adjacent cells.

Step 309. The second radio base station 14 may also continue to determine traffic statistics in the second cell 16. A requested report interval, a periodicity, may be specified in an Information Element Reporting Periodicity in the Resource Status Request. The Resource Status Update message is initiated in the second radio base station 14 to report the result of load measurements to the first radio base station 10 according to the specified periodicity.

Step 310. The second radio base station 14 may report the determined traffic statistics with the periodicity in a Resource Status Update. Load measurement indicators, for example, values from counters, may be reported for all cells in second radio base station 14 where load measurements are active. The periodicity may be preconfigured in the radio base station or indicated in the Resource Status Request message.

The Resource Status Update message may comprise an indication of a load statistical information from a past load measurement period.

Step 311. The first radio base station 10 receives the Resource Status Update message and based on that determines the performance state of the first cell 12. The first radio base station 10 may terminate ongoing load measurements in the second radio base station 14 by triggering the Resource Status Request message and setting the Registration Request IE to "stop".

Embodiments according to FIG. 3 provide a solution that enables the possibility to reliably detect sleeping cells by comparing the traffic activity of the first cell with traffic activity within a second cell. Thereby the number of faulty alarms may be reduced and minimised. For example, embodiments herein do not rely on "old" statistical information that may have been recorded at "abnormal", high load situations. In addition, embodiments herein do not require updates to existing user equipment and will work without reconfiguring the user equipments.

Figure 4:
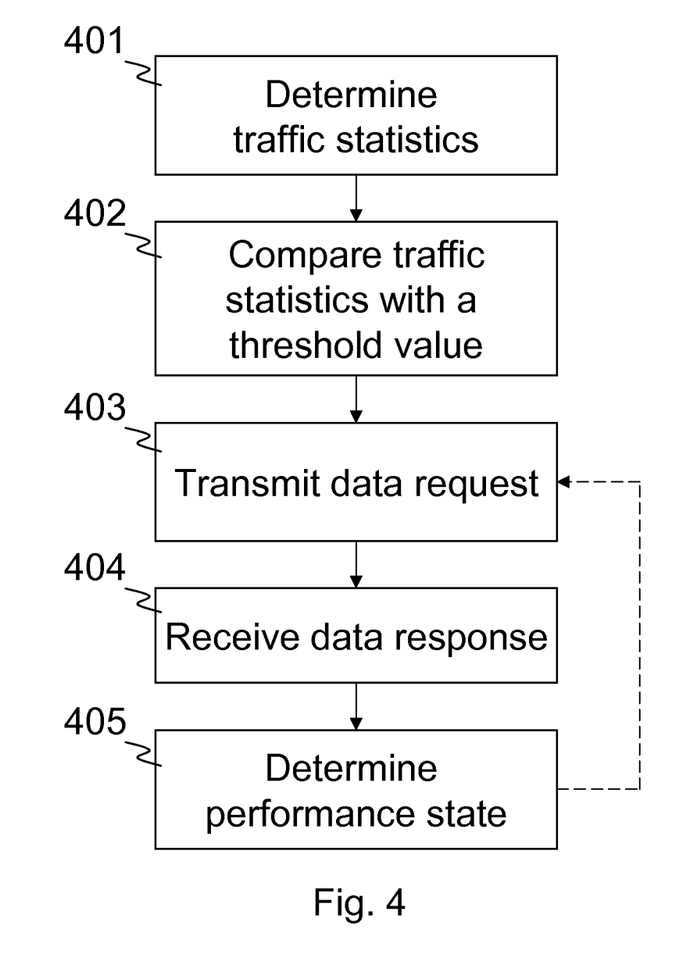
FIG. 4 is a schematic flow chart of a method in a first radio base station.

The method steps in the first radio base station, referred to as the first radio base station 10 in the figures, for determining the performance state of the first cell 12 served by the first radio base station 10, according to some general embodiments will now be described with reference to a flowchart depicted in FIG. 4. The first radio base station 10 is comprised in a radio communications network. It should be noted that the steps do not have to be taken in the order stated below, but may be taken in any suitable order.

Step 401. The first radio base station 10 determines traffic statistics of the first cell 12. For example, the first radio base station 10 may determine traffic statistics by detecting traffic amount, number of access attempts, number of hand over request received or transmitted, or number of rejected hand over requests, in the first cell 12 over a time interval. The time interval may be preset during configuration or manually, or changing dynamically due to hour of the day, day of the week or similarly. This step corresponds to the step 201 in FIG. 2 and step 301 in FIG. 3.

Step 402. The first radio base station 10 compares the traffic statistics with a threshold value. The threshold value may be preset or dynamically updated and be an upper or lower limit of the determined traffic statistics. For example, the threshold value may be an upper limit of rejected access attempts, a lower limit of amount of bits transmitted over the time interval or similar. In some embodiments, the traffic history of the first cell 12 may be kept in each radio base station up to one week. When determined traffic statistics show a low activity in the first cell 12, a comparison is made against the traffic history to see if the low activity is "normal" or not. This step corresponds to the step 202 in FIG. 2 and step 302 in FIG. 3.

Step 403. When the determined traffic statistics goes beyond the threshold value the first radio base station 10 transmits a data request to a second radio base station 14 requesting data retrieved in or associated with a second cell 16 to be used to determine the performance state of the first cell 12. This step corresponds to the step 204 in FIG. 2 and step 303 in FIG. 3. The second cell 16 may be an adjacent cell to the first cell 12.

In some first embodiments, the data request may be represented by a test measurement request to be sent to the second cell 16. The second cell 16 is then a neighbouring cell to the first cell 12. The test measurement request may comprise an indication that at least one user equipment 18 in the second cell 16 is to be ordered to perform a performance test measurement of the first cell 12. The number of user equipment in each cell may be indicated as a percentage of connected user equipment, a value indicating explicitly number of user equipments or the like. Selected user equipments in the second cell 16 initiate the CGI measurement on the first cell 12 listening for the Physical Cell Identity (PCI) of the first cell 12.

In some second embodiments, the data request may be represented by a traffic statistics request requesting an indication of traffic statistics of the second cell 16. The traffic statistics request may be represented by a resource status request.

Furthermore, the first radio base station 10 may determine number of user equipments that are in a connected mode within the first cell 12, and the transmitting step 403 is performed when the traffic amount is below the threshold value and there is no connected user equipment.

Step 404. The first radio base station 10 receives a data response indicating the requested data from the second radio base station 14. This step corresponds to the step 208 in FIG. 2 and step 306 in FIG. 3.

In the case of first embodiments, the data response may then be represented by a test measurement response indicating a result of the performance test measurement performed by the at least one user equipment 18.

The performance test measurement may be a measurement to identify a cell identity of the first cell 12 in a broadcast channel in the second cell 16. For example, user equipment in the second cell 16 should try to identify Physical Cell Identity (PCI) of the first cell 12 in a broadcast channel in the radio communications network. The user equipment may then retrieve Cell Global Identity (CGI) from system information in the broadcast channel and report this back to the second radio base station 14. The PCI and/or CGI may be indicated in the test measurement request.

In the case of second embodiments, the data response may be represented by a traffic statistics response indicating traffic statistics within the second cell 16. The first radio base station 12 may determine the resource status request as received at the second radio base station 14 when receiving a resource status response from the second radio base station 14. The traffic statistics response may then be represented by a resource status update.

It should be noted that the traffic statistics of the first cell 12 and traffic statistics of the second cell 16 may corresponds to a same or similar type of traffic statistics. For example, the first radio base station 10 may determine amount of transmitted data in the first cell 12 and the second radio base station 14 may transmit amount of transmitted data in the second cell 16. The second radio base station 14 may also indicate activity using a different type of traffic statistics such as number of random access attempts.

Step 405. The first radio base station 10 determines the performance state of the first cell (12) based on the data response. This step corresponds to the step 209 in FIG. 2 and step 307 in FIG. 3.

In the first embodiments, the step of determining the performance state is based on whether a successful test measurement response is received or not. In the second embodiments the step of determining the performance state comprises comparing the traffic statistics of the first cell 12 with the received traffic statistics of the second cell 16. From the outcome of the comparison the performance state of the first cell is determined.

The first radio base station 10 may determine the first cell 12 to be in a degraded performance state when the traffic statistics of the first cell 12 differs from the traffic statistics of the second cell 14 outside an interval of difference. For example, if the first cell 12 has less than twenty random access attempts than the second cell 16 over a time interval of five minutes the first cell 12 is determined to be in a performance degraded state. The interval may be preset or dynamically changing depending on, for example, time of day or similar. This interval is used to eliminate or minimize that the first cell 12 is determined to be in a degraded state back and forth.

Also, the first radio base station 10 may transmit the traffic statistics request to a number of radio base stations. Each radio base station serves a number of cells and each radio base station reports the traffic statistics in the served cells to the first radio base station 10. Then, the first cell 12 is determined to be in a degraded performance state when the determined traffic statistics differs outside the interval for a majority of the number of cells controlled by the number of second radio base stations. For example, the first cell 12 is determined to be in a degraded performance state when more than fifty percent differs from the traffic statistics in the first cell outside the interval. However, in some embodiments, it may be enough that one cell differ or a minor percentage, such as twenty percent.

It should be noted that the second cell 16 does not have to be a neighbouring cell to the first cell 12 but the second radio base station 14 may be serving at least one cell neighbouring the first cell 12. Thus, the second radio base station 14 should have a relation established to the first radio base station 10, such as an X2 interface, in order to communicate with each other. In the first embodiments, the first radio base station 10 may determine that the second cell 16 is a neighbouring cell to the first cell 12 from Automatic Neighbouring Relations data stored in the first radio base station 10. The test measurement request may then be sent to a subset of its neighbouring cells based on previously defined ANR connections.

In some second embodiments, the resource status request may trigger the resource status update to be sent periodically from the second radio base station 14. Thus, the traffic statistics response may be received periodically at the first radio base station 10. A periodicity may be preset in the radio communications network or indicated in the traffic statistics request.

In some embodiments, the first radio base station 10 may need to transmit a stop reporting request to the second radio base station 14 to stop the traffic statistics responses.

It should here be noted that the first embodiments may be combined with the second embodiments as indicated by the dashed arrow. Thus, in some embodiments, the first radio base station 10 determines that the first cell 12 is in a degraded performance state based on comparing traffic statistics in the first and second cells. Then, in order to ensure that the first cell 12 is in a degraded performance state, the first radio base station 10 may test the first cell 12 with the use of the user equipment 18 in the second or a different neighboring cell by sending a test measurement request to a radio base station serving the second or the different neighboring cell. It should be understood that it may be performed the other way around, i.e. first perform the test measurement process and then compare the traffic statistics.

The first radio base station 10 and the second radio base station 14 is interconnected by the X2-AP protocol and it is currently described in Evolved Universal Terrestrial Radio Access Network (E-UTRAN); X2 Application Protocol (X2AP), Thus, embodiments provide the possibility to test suspected cells if they are fully functional initiated by said X2 protocol.

Figure 5:
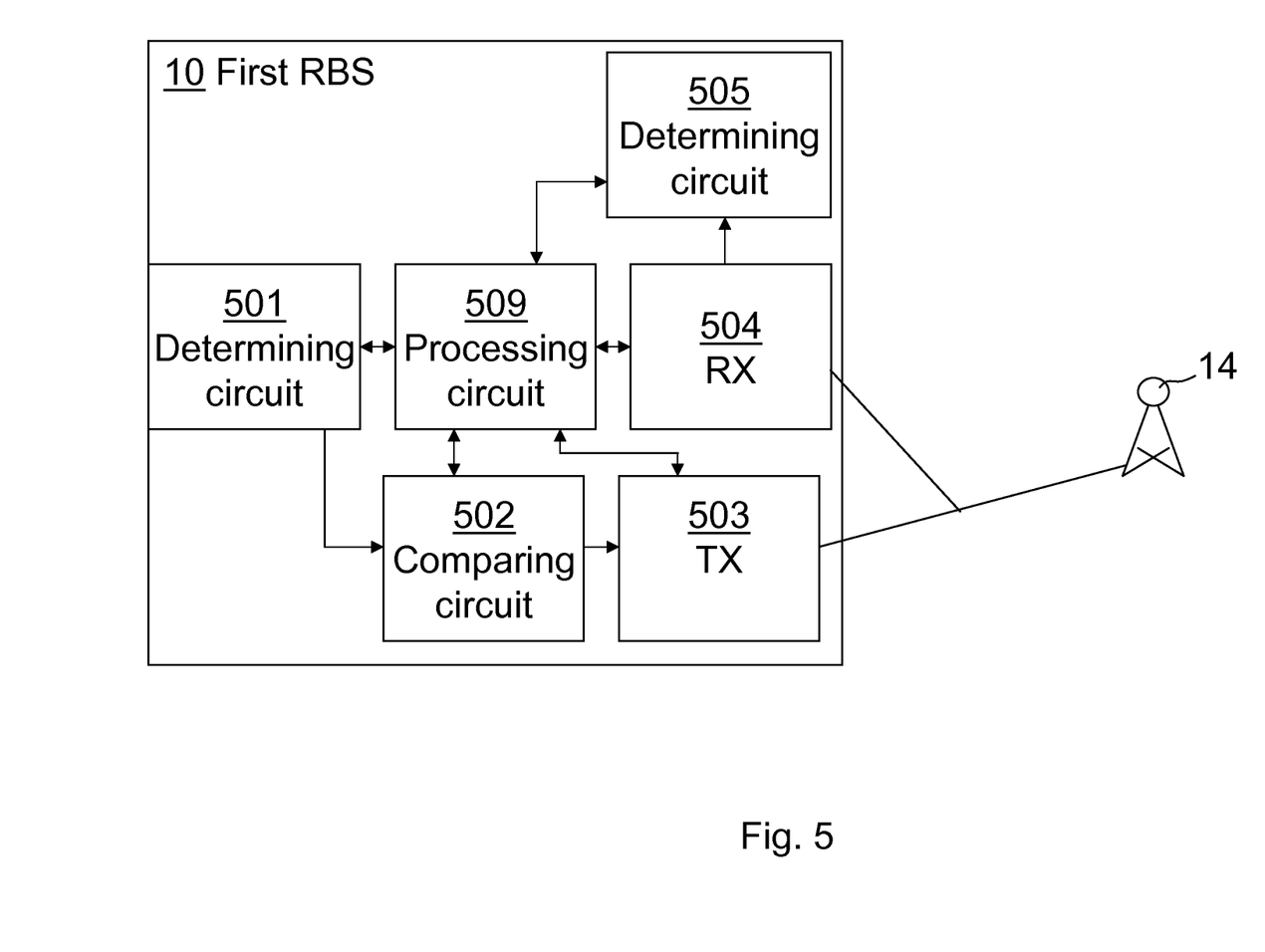
FIG. 5 is a block diagram of a first radio base station.

In order to perform the method a first radio base station 10 is provided. FIG. 5 shows a block diagram of the first radio base station 10. The first radio base station is for determining a performance state of a first cell 12 served by the first radio base station 10. Also, the first radio base station 10 is arranged to be comprised in a radio communications network.

The first radio base station comprises a determining circuit 501 configured to determine traffic statistics of the first cell 12 and a comparing circuit 502 configured to compare the traffic statistics with a threshold value. As stated above the traffic statistics may comprise number of access attempts, number of hand over request received or transmitted, number of rejected hand over requests, or amount of Uplink and/or Downlink data.

Furthermore, the first radio base station 10 comprises a transmitting circuit 503, TX, configured to transmit, when the determined traffic statistics goes beyond the threshold value, a data request to a second radio base station 14 requesting data retrieved in or associated with a second cell 16 to be used to determine the performance state of the first cell 12.

In some first embodiments, the data request may be represented by a test measurement request to be sent to the second cell 16. The second cell 16 is then a neighbouring cell to the first cell 12. The test measurement request may comprise an indication that at least one user equipment 18 in the second cell 16 is to be ordered to perform a performance test measurement of the first cell 12. In some first embodiments, the determining circuit 501 may be arranged to determine that the second cell 16 is a neighbouring cell to the first cell 12 from Automatic Neighbouring Relations data stored in the first radio base station 10. The test measurement request may then be sent to a subset of its neighbouring cells based on previously defined ANR connections.

In some second embodiments, the data request may be represented by a traffic statistics request requesting an indication of traffic statistics of the second cell 16. The traffic statistics request may be represented by a resource status request.

The first radio base station 10 also comprises a receiving circuit 504, RX, configured to receive a data response indicating the requested data from the second radio base station 14.

In the case of first embodiments, the data response may be represented by a test measurement response indicating a result of the performance test measurement performed by the at least one user equipment 18.

In the case of second embodiments, the data response may be represented by a traffic statistics response indicating traffic statistics within the second cell 16. The first radio base station 12 may determine the resource status request as received at the second radio base station 14 when receiving a resource status response from the second radio base station 14. The traffic statistics response may then be represented by a resource status update.

Additionally, the first radio base station 10 comprises an additional determining circuit 505 configured to determine the performance state of the first cell 12 based on the data response.

In the first embodiments, the additional determining circuit 505 is configured to determine the performance state of the first cell 12 based on whether a successful test measurement response is received or not In some second embodiments, the additional determining circuit 505 is configured to compare the traffic statistics of the first cell 12 with the received traffic statistics of the second cell 16, and based on an outcome of the comparison the performance state is determined. The first cell 12 may be determined to be in a degraded performance state when the traffic statistics of the first cell 12 differs, from the traffic statistics of the second cell 14, outside an interval of difference. The interval may be ±10 percent of the traffic statistics of the first cell 12. The additional determining circuit 505 may be arranged to determine, when the transmitting circuit 503 has transmitted the traffic statistics request to a plurality of radio base station, that the first cell 12 is in a degraded performance state when the determined traffic statistics differs outside the interval for a majority of a number of cells controlled by the plurality of second radio base stations. A majority may be if six out of ten cells report traffic statistics outside the interval or similar.

It should be understood that the first radio base station 10 may comprise a memory circuit for storing data from the methods and programs to perform the methods herein.

Figure 6:
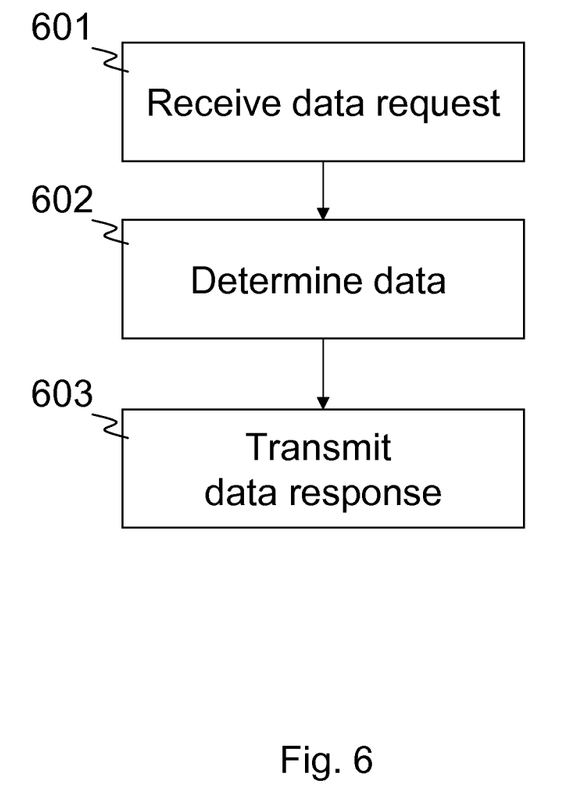
FIG. 6 is a schematic flow chart of a method in a second radio base station.

The method steps in the second radio base station 14 for enabling a first radio base station 10 to determine a performance state of a first cell 12 served by the first radio base station 10 according to some further embodiments will now be described with reference to a flowchart depicted in FIG. 6. The steps do not have to be taken in the order stated below, but may be taken in any suitable order.

The first and second radio base stations 10,14 are comprised in a radio communications network and the second radio base station 10 serves a second cell 16 of the radio communications network.

Step 601. The second radio base station 14 receives a data request from the first radio base station 10. The data request is requesting data retrieved in or associated with a second cell 16. The requested data is to be used to determine the performance state of the first cell 12. This step corresponds to the step 204 in FIG. 2 and the step 303 in FIG. 3.

In some first embodiments the data request may be represented by a test measurement request. The test measurement request may comprise an indication that at least one user equipment 18 in the second cell 16 is to perform a performance test measurement of the first cell 12.

In some second embodiments, the data request may be represented by a traffic statistics request requesting an indication of traffic statistics of the second cell 16.

Step 602. The second radio base station 14 determines the requested data. The requested data may be determined by reading counters of a latest traffic statistics analysis, initiating a traffic statistics analysis, retrieving data of a stored latest test measurement, initiating a test measurement or similar. This step corresponds to the step 205-207 in FIG. 2 and to the step 304 in FIG. 3.

In some first embodiments, the step of determining data 602 comprises to determine a cell measurement response to the performance test measurement of the first cell 12 and the data response comprises a test measurement response indicating the cell measurement response. The second radio base 14 may in some embodiments determine a number of connected user equipments in the second cell 16. The second radio base station 14 then transmits a cell measurement request to at least a part of the determined number of connected user equipments. The cell measurement request indicates to the user equipment 18 to perform the performance test measurement of the first cell 12. The second radio base station 14 then receives the cell measurement response from at least one of the number of connected user equipment.

The performance test measurement to be performed comprises to identify cell identity of the first cell in a broadcast channel, such as a CGI/PCI measurement, in the second cell 16.

As stated above, the data request may be represented in some second embodiments by a traffic statistics request requesting an indication of traffic statistics of the second cell 16. Hence, the step of determining 602 requested data comprises collecting the requested traffic statistics.

Step 603. The second radio base station 14 transmits a data response to the first radio base station 10 indicating the data determined in step 602. For example, the second radio base station 14 transmits an indication of the traffic activity in the second cell 16 or a result of a test measurement in the second cell 16. The response may comprise data of a plurality of cells served by the second radio base station 14. This step corresponds to the step 208 in FIG. 2 and the step 306 in FIG. 3.

It should be noted that in some first embodiments the test measurement request may comprise the performance test measurement order and the second radio base station 14 forwards this order to the user equipment 18. Furthermore, the test measurement response may comprise the cell measurement response which may be forwarded or repackaged in a different message by the second radio base station 14.

The data response may in some second embodiments be represented by a traffic statistics response indicating collected traffic statistics of the second cell 16. In some second embodiments the second radio base station 14 may transmit an acknowledgement of the received traffic statistics request. Further, the second radio base station 14 may transmit, with a periodicity, an updated traffic statistics response. The periodicity may be preset or indicated in the data request from the first radio base station 10. The traffic statistics request may be represented by a resource status request message. The optional acknowledgement sent back to the first radio base station 10 may be represented by a resource status response message, and the traffic statistics response may be represented by a resource status update message.

Figure 7:
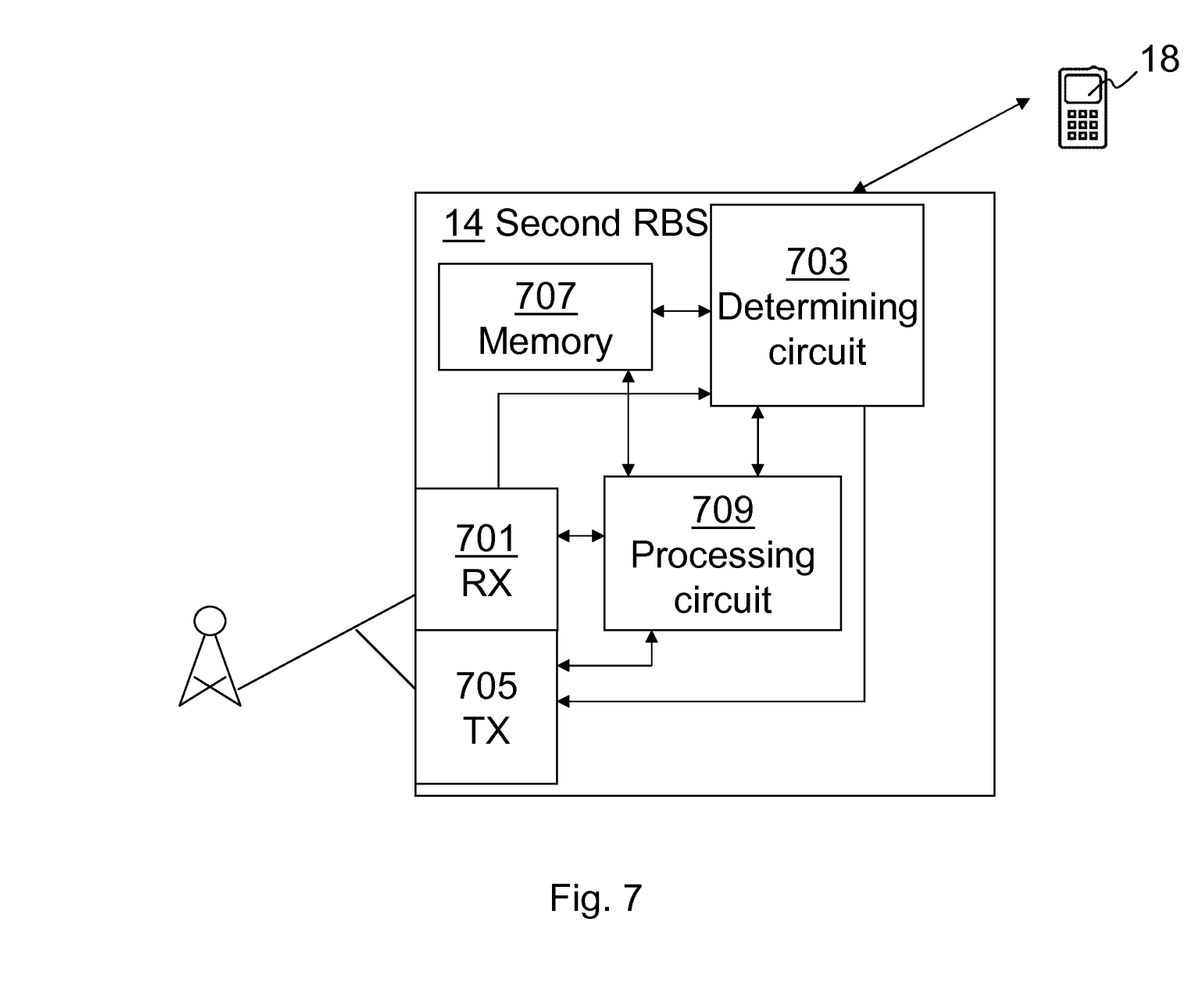
FIG. 7 is a block diagram of a second radio base station.

In order to perform the method a second radio base station 14 is provided. FIG. 7 is a block diagram of the second radio base station 14. The second radio base station 14 is arranged to enable a first radio base station 10 to determine a performance state of a first cell 12 served by the first radio base station 10. The first and second radio base stations 10,14 are arranged to be comprised in a radio communications network and the second radio base station is configured to serve a second cell 16 of the radio communications network.

The second radio base station comprises a receiving circuit 701, RX, configured to receive a data request from the first radio base station 10 requesting data retrieved in or associated with the second cell 16 to be used to determine the performance state of the first cell 12. In some first embodiments, the data request may be represented by a test measurement request comprising an indication that at least one user equipment 18 in the second cell 16 is to perform a performance test measurement of the first cell 12. The performance test measurement may be to identify cell identity of the first cell 12 in a broadcast channel in the second cell 16.

In some second embodiments, the data request may be represented by a traffic statistics request requesting an indication of traffic statistics of the second cell 16.

Also, the second radio base station comprises a determining circuit 703 configured to determine the requested data. In some first embodiments the determining circuit 703 is configured to determine a cell measurement response to the performance test measurement. In some second embodiments, the determining circuit 703 is configured to determine a number of connected user equipments in the second cell 16. In some first embodiments, the determining circuit 703 may be configured to transmit a cell measurement request to at least a part of the determined number of connected user equipments indicating to perform the performance test measurement of the first cell 12.

Furthermore, the determining circuit 703 may be arranged to receive the cell measurement response from at least one of the number of connected user equipment.

In some second embodiments the determining circuit 703 is configured to collect the requested traffic statistics.

Furthermore, the second radio base station 10 comprises a transmitting circuit 705, TX, configured to transmit a data response to the first radio base station 10 indicating the determined requested data. In some first embodiments, the data response comprises a test measurement response indicating the cell measurement response. In some second embodiments the data response may be represented by a traffic statistics response indicating collected traffic statistics of the second cell 16. The transmitting circuit 705 may be configured to transmit the data response with a periodicity, referred to as an updated traffic statistics response.

It should be noted that the second radio base station 14 may comprise a memory circuit 707 comprising data of previously collected data regarding the activity or detected cells in the broadcast channel. The memory circuit 707 may also be used to store programs to perform the embodiments presented herein.

The present mechanism for determining a performance state of a first cell 12 served by the first radio base station 10 may be implemented through one or more processors, such as a processing circuit 509 in the first radio base station 10 depicted in FIG. 5 or such as a processing circuit 709 in the second radio base station 14 depicted in FIG. 7, together with computer program code for performing the functions of the present solution. The program code mentioned above may also be provided as a computer program product, for instance in the form of a data carrier carrying computer program code for performing the present solution when being loaded into the radio base stations 10,14. One such carrier may be in the form of a CD ROM disc. It is however feasible with other data carriers such as a memory stick. The computer program code may furthermore be provided as pure program code on a server and downloaded to the radio base stations 10, 14.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a first radio base station for determining a performance state of a first cell served by the first radio base station, which first radio base station is comprised in a radio communications network, the method comprising:
   determining traffic statistics of the first cell,
   comparing the traffic statistics with a threshold value,
   when the traffic statistics exceed the threshold value, transmitting a data request to a second radio base station serving a second cell, requesting data indicating traffic statistics retrieved in or associated with a second cell,
   receiving a data response indicating the requested data from the second radio base station, and
   determining the performance state of the first cell based on the data response,
   wherein the data request comprises a traffic statistics request requesting an indication of traffic statistics of the second cell, wherein the data response comprises a traffic statistics response indicating traffic statistics within the second cell, and wherein the determining the performance state is based on comparing the traffic statistics of the first cell with received traffic statistics of the second cell.

2. A method according to claim 1, wherein the first cell is determined to be in a degraded performance state when the traffic statistics of the first cell differs from the traffic statistics of the second cell outside a defined difference interval.

3. A method according to claim 2, wherein:
the traffic statistics request is transmitted to a plurality of radio base stations, and
the first cell is determined to be in the degraded performance state when the determined traffic statistics differs outside the defined difference interval for a majority of a number of cells controlled by the plurality of second radio base stations.

4. A method according to claim 1, wherein:
the traffic statistics request comprises a resource status request which is determined to be received at the second radio base station when receiving a resource status response from the second radio base station, and
the traffic statistics response comprises a resource status update.

5. A method according to claim 1, wherein the traffic statistics response is received periodically.

6. A method according to claim 1, further comprising determining that the second cell is a neighboring cell to the first cell in response to Automatic Neighboring Relations data stored in the first radio base station.

7. A method according to claim 1,
wherein the data request comprises a test measurement request indicating that at least one user equipment in the second cell is to be ordered to perform a performance test measurement of the first cell, and
wherein the data response comprises a test measurement response indicating a result of the performance test measurement performed by the at least one user equipment in the second cell.

8. A method in a second radio base station for enabling a first radio base station to determine a performance state of a first cell served by the first radio base station, which first and second radio base stations are comprised in a radio communications network and the second radio base station serves a second cell of the radio communications network; the method comprising:
receiving a data request from the first radio base station, requesting data indicating traffic statistics retrieved in or associated with the second cell, wherein the data request comprises a traffic statistics request requesting an indication of traffic statistics of the second cell,
collecting traffic statistics; and
transmitting a data response to the first radio base station based on the determined requested data, wherein the data response comprises a traffic statistics response indicating the traffic statistics of the second cell for use in determining the performance state of the first cell.

9. A method according to claim 8, further comprising transmitting, with a periodicity, an updated traffic statistics response.

10. A method according to claim 8, wherein:
the traffic statistics request comprises a resource status request message,
an acknowledgement sent back to the first radio base station comprises a resource status response message, and the traffic statistics response comprises a resource status update message.

11. A method according to claim 8,
wherein the data request comprises a test measurement request indicating that at least one user equipment in the second cell is to perform a performance test measurement of the first cell, and
wherein the data response comprises a test measurement response indicating a result of the performance test measurement performed by the at least one user equipment in the second cell.

12. A method according to claim 11, wherein the performance test measurement comprises identifying a cell identity of the first cell in a broadcast channel in the second cell.

13. A method according to claim 11, wherein the determining the cell measurement response comprises:
determining a number of connected user equipments in the second cell,
transmitting a cell measurement request to at least a part of the determined number of connected user equipments indicating they are to perform the performance test measurement of the first cell, and
receiving the cell measurement response from at least one of the number of connected user equipment.

14. A method according to claim 11, wherein the performance test measurement to be performed comprises identifying a cell identity of the first cell in a broadcast channel in the second cell.

15. A first radio base station for determining a performance state of a first cell served by the first radio base station, which first radio base station is arranged to be comprised in a radio communications network, the first radio base station comprising:
a determining circuit configured to determine traffic statistics of the first cell,
a comparing circuit configured to compare the traffic statistics with a threshold value,
a transmitting circuit configured to transmit, when the traffic statistics exceed the threshold value, a data request to a second radio base station serving a second cell, requesting data indicating traffic statistics retrieved in or associated with a second cell,
a receiving circuit configured to receive a data response indicating the requested data from the second radio base station, and
an additional determining circuit configured to determine the performance state of the first cell based on the data response,
wherein the data request comprises a traffic statistics request requesting an indication of traffic statistics of the second cell,
wherein the data response comprises a traffic statistics response indicating traffic statistics within the second cell, and
wherein the additional determining circuit is further configured to determine the performance state based on comparing the traffic statistics of the first cell with received traffic statistics of the second cell.

16. A second radio base station arranged to enable a first radio base station to determine a performance state of a first cell served by the first radio base station, which first and second radio base stations are arranged to be comprised in a radio communications network and the second radio base station is configured to serve a second cell of the radio communications network, the second radio base station comprising:

a receiving circuit configured to receive a data request from the first radio base station, requesting data indicating traffic statistics retrieved in or associated with the second cell, wherein the data request comprises a traffic statistics request requesting an indication of traffic statistics of the second cell, a determining circuit configured to determine the requested data indicating traffic statistics, and a transmitting circuit configured to transmit a data response to the first radio base station based on the determined requested data indicating traffic statistics, wherein the data response comprises a traffic statistics response indicating the traffic statistics of the second cell for use in determining the performance state of the first cell.

17. A method in a first radio base station for determining a performance state of a first cell served by the first radio base station, the method comprising:

determining traffic statistics of the first cell, comparing the traffic statistics with a threshold value, when the traffic statistics of the first cell exceed the threshold value, transmitting a data request from the first radio base station to a plurality of other radio base stations requesting data indicating traffic statistics retrieved in or associated with the plurality of other radio base stations, receiving data responses from at least one of the plurality of other radio base stations indicating traffic statistics from the at least one of the plurality of other radio base stations, and determining the performance state of the first cell based on the data responses, wherein the first cell is determined to be in a degraded performance state when the traffic statistics from the at least one of the plurality of radio base stations differs outside a defined difference interval for a majority of a number of cells controlled by the at least one of the plurality of radio base stations, wherein the data request comprises a traffic statistics request requesting an indication of traffic statistics of the second cell, wherein the data response comprises a traffic statistics response indicating traffic statistics within the second cell, and wherein the determining the performance state comprises comparing the traffic statistics of the first cell with received traffic statistics of the second cell, and determining the performance state based on an outcome of the comparing.

\* \* \* \* \*

UNITED STATES PATENT AND TRADEMARK OFFICE
CERTIFICATE OF CORRECTION

PATENT NO. : 9,179,348 B2  
APPLICATION NO. : 13/701556  
DATED : November 3, 2015  
INVENTOR(S) : Östrup et al.

Page 1 of 1

It is certified that error appears in the above-identified patent and that said Letters Patent is hereby corrected as shown below:

In the specification,

In Column 11, Lines 39-40, delete "base station 12" and insert -- base station 10 --, therefor.

In Column 12, Line 2, delete "second cell 14" and insert -- second cell 16 --, therefor.

In Column 13, Lines 49-50, delete "base station 12" and insert -- base station 10 --, therefor.

In Column 14, Line 3, delete "second cell 14," and insert -- second cell 16, --, therefor.

Signed and Sealed this  
Twenty-ninth Day of March, 2016

Michelle K. Lee  
*Director of the United States Patent and Trademark Office*